(12) United States Patent
Boecker et al.

(10) Patent No.: US 12,235,051 B2
(45) Date of Patent: Feb. 25, 2025

(54) PIPE ARRANGEMENT FOR TRANSPORTING TEMPERATURE CONTROL MEDIA

(71) Applicant: TI Automotive Technology Center GmbH, Rastatt (DE)

(72) Inventors: Albert Boecker, Ettlingen (DE); Matthias Winter, Rastatt (DE); Thorsten Schaefer, Steinfeld (DE); Florian Deibel, Sinzheim (DE); Mathieu Aucouturier, Schiltigheim (DE)

(73) Assignee: TI AUTOMOTIVE TECHNOLOGY CENTER GMBH, Rastatt (DE)

( * ) Notice: Subject to any disclaimer, the term of this patent is extended or adjusted under 35 U.S.C. 154(b) by 0 days.

(21) Appl. No.: 17/466,387

(22) Filed: Sep. 3, 2021

(65) Prior Publication Data
US 2022/0065554 A1    Mar. 3, 2022

(30) Foreign Application Priority Data

Sep. 3, 2020   (EP) ..................................... 20194403
Jul. 2, 2021   (EP) ..................................... 21183388

(51) Int. Cl.
*F16L 9/19*    (2006.01)
*B60H 1/00*    (2006.01)
(Continued)

(52) U.S. Cl.
CPC ......... *F28F 1/006* (2013.01); *B60H 1/00564* (2013.01); *F16L 9/20* (2013.01);
(Continued)

(58) Field of Classification Search
CPC ......... B29C 49/00; B29C 49/20; B29C 49/04; B29C 2049/2008; B29C 2049/2047;
(Continued)

(56) References Cited

U.S. PATENT DOCUMENTS 1,726,531 A * 9/1929 Andel ................ B60H 1/00335
                                                   165/41
3,477,501 A * 11/1969 Es ............................. F28D 7/14
                                                   165/103
(Continued)

FOREIGN PATENT DOCUMENTS

DE   102014218935 A1 *  3/2016  ......... B60H 1/00564
EP       1189010 A2      3/2002
(Continued)

OTHER PUBLICATIONS

Machine translation of EP-3098100 (Year: 2024).*
(Continued)

*Primary Examiner* — Eric S Ruppert
*Assistant Examiner* — Hans R Weiland
(74) *Attorney, Agent, or Firm* — Dickinson Wright PLLC

(57) ABSTRACT

Pipe arrangement for transporting temperature control media, comprising a base body which is produced by way of blow molding and from which at least a first channel and a second channel are formed, wherein the first channel and the second channel have a first orientation towards one another in a first section and a second orientation towards one another in a second section, wherein the first orientation is different from the second orientation.

21 Claims, 13 Drawing Sheets

(51) Int. Cl.
*F28D 7/00* (2006.01)
*F28D 7/10* (2006.01)
*F28F 1/00* (2006.01)
*F28D 21/00* (2006.01)

(52) U.S. Cl.
CPC ............ *F28D 7/0016* (2013.01); *F28D 7/10* (2013.01); *F28D 2021/008* (2013.01)

(58) Field of Classification Search
CPC ........... B29L 2023/004; B29L 2023/22; B60H 1/00564; F16L 9/20; F28D 7/10; F28D 7/103; F28D 7/106; F28D 7/14
See application file for complete search history.

(56) References Cited

U.S. PATENT DOCUMENTS

| | | | | |
|---|---|---|---|---|
| 4,242,877 | A * | 1/1981 | Geerkens | F28D 7/103 62/93 |
| 4,411,307 | A * | 10/1983 | Ecker | F28D 7/14 165/70 |
| 4,865,004 | A * | 9/1989 | Widmer | F28D 7/106 123/541 |
| 4,893,670 | A * | 1/1990 | Joshi | F28D 7/106 184/104.1 |
| 6,390,137 | B1 * | 5/2002 | Ewald | F28D 7/106 138/155 |
| 6,648,067 | B1 * | 11/2003 | Maute | F28D 9/0037 165/905 |
| 6,660,198 | B1 * | 12/2003 | Fischer | B60H 1/00564 264/238 |
| 2006/0048923 | A1 * | 3/2006 | Domen | F28D 9/0043 264/250 |
| 2006/0096744 | A1 * | 5/2006 | Nakamura | F16L 9/18 165/169 |
| 2007/0128997 | A1 * | 6/2007 | Prince | B60H 1/00564 454/129 |
| 2008/0245098 | A1 * | 10/2008 | Yamanaka | F28D 7/14 62/513 |
| 2010/0018673 | A1 * | 1/2010 | Yang | F28D 7/106 165/104.19 |
| 2012/0055660 | A1 * | 3/2012 | Walker | F28D 7/106 165/172 |
| 2014/0060786 | A1 * | 3/2014 | Choi | F28D 7/10 165/156 |
| 2015/0114611 | A1 * | 4/2015 | Morris | F28D 7/106 29/890.036 |
| 2018/0094868 | A1 * | 4/2018 | Lee | F28D 7/10 |
| 2019/0353427 | A1 * | 11/2019 | Johnson | F28D 7/106 |

FOREIGN PATENT DOCUMENTS

| | | | | |
|---|---|---|---|---|
| EP | | 3098100 A1 * | 11/2016 | ........ B60H 1/00564 |
| JP | | 2005335628 A * | 12/2005 | |

OTHER PUBLICATIONS

Machine translation of JP-2005-335628 (Year: 2024).*
English translation of Japanese Office Action from JP202111026534.8 dated Apr. 11, 2024.

* cited by examiner

PIPE ARRANGEMENT FOR TRANSPORTING TEMPERATURE CONTROL MEDIA

RELATED APPLICATIONS

The present disclosure is a national phase application of European Application 20194403.0, filed on Sep. 3, 2020 and European Application 21183388.4, filed on Jul. 2, 2021, the entire contents of each of which are incorporated herein by reference.

FIELD

The disclosure relates to a pipe arrangement for transporting temperature control media, comprising a base body produced by means of blow molding, from which at least a first channel and a second channel are formed.

BACKGROUND

Temperature control media are needed, for example, in electromobility. Electric vehicle batteries, especially lithium-ion batteries, have an optimal performance only within a limited temperature spectrum. Depending on the ambient temperature, it may therefore be necessary to heat or cool the batteries. Therefore, the drive unit of an electric vehicle generally has a temperature control circuit with a pipe arrangement through which temperature control media can be fed to the cells of the battery in order to temper them within a desired temperature spectrum. Due to installation space limitations, the temperature control unit should be as compact as possible.

Furthermore, it may be necessary to temper, in particular to cool, components of the entire drive unit of electric vehicles. In addition to the battery, this includes the power electronics and the electric motor. The charging electronics and the associated plug connections and cables can also be cooled by means of the temperature control unit. This is particularly relevant in the context of fast charging processes.

In addition to use in a drive unit, there is a further area of application in connection with other vehicle electronics, in particular sensors and on-board computers. If a vehicle is equipped for autonomous driving, powerful sensors and powerful computers are required, wherein the systems are redundantly present. Due to the fact that the installation space in a vehicle is limited, these systems also have special requirements for a temperature control unit to control the temperature of these components.

Temperature control media are also used in air conditioning systems. Air conditioning systems, in particular mobile air conditioning systems, comprise a pipe arrangement which enables the transport of temperature control medium between the individual units of the air conditioning system. In mobile air conditioning systems, for example in air conditioning systems used for climate control of the interiors of motor vehicles, the pipe arrangement is a comparatively complex structure and often comprises pipes made of different materials, for example pipes made of metal, pipe sections made of thermoplastic material and pipe sections made of rubber-like material. Although the operating conditions of the pipe sections can be optimally adapted to the respective requirements, the pipe arrangement is cost-intensive, complex to assemble and difficult to recycle.

In all applications, there is often a requirement for the pipe arrangement to be particularly compact. In some cases, the channels are to be used to supply units with medium, which may be arranged in different locations, resulting in the need for crossed pipe routing, which requires more installation space. Accordingly, crossed pipe routing can result in a bulky pipe arrangement with increased installation space requirements.

BRIEF SUMMARY

The disclosure provides a pipe arrangement which has a particularly small installation space requirement.

This is achieved using the features of claim 1. The dependent claims refer to advantageous embodiments.

One pipe arrangement for transporting temperature control media according to the disclosure comprises a base body produced by means of blow molding, from which at least a first channel and a second channel are formed, wherein the first channel and the second channel have a first orientation towards one another in a first section and a second orientation towards one another in a second section, wherein the first orientation is different from the second orientation.

A pipe arrangement according to the disclosure preferably comprises a base body produced by means of blow molding. Blow molding makes it possible to produce a base body with a complex shape. The channels are preferably formed of a single material and in one piece from the base body. Preferably, plastics such as thermoplastic polymers, thermoplastic elastomers are used as the material for the pipe arrangement. Depending on the pressure conditions in the media transported in the pipe arrangement, the pipe arrangement can be formed to be single-layered, but also multi-layered.

The base body may comprise a plurality of channels which may be shaped, for example curved, in the form required for the mounting location. Furthermore, there is great freedom in the choice of the cross-sectional shape of the channel.

Furthermore, in a pipe arrangement according to the disclosure, the channel routing is performed such that the channels have a first orientation towards one another in a first section and a second orientation towards one another in a second section, wherein the first orientation is different from the second orientation. In this context, it is particularly conceivable that the channels in the first section run in a first plane relative to each other, for example in a vertical plane, and that the channels in a second section run in a second plane relative to each other, for example in a horizontal plane. The pipe arrangement can thus have a shape adapted to the available installation space and the channels can change their orientation towards one another at narrow points and the like.

A further improvement in the utilization of installation space is achieved if the cross-section of the channels is adapted to the available installation space. For example, the channels may have a circular cross-section in a first section and an oval or rectangular cross-section in a second section.

The orientation of the channels may change in a third section and/or in a fourth section. To this end, the channels in the third section and/or the fourth section may be formed in an arcuate shape. The arcuate routing results in a particularly low pressure loss. However, if the installation space is very limited, the channels in the third and/or fourth section can also have an angular deflection.

A further pipe arrangement according to the disclosure for transporting temperature control media comprises a base body produced by means of blow molding, from which at least a first channel and a second channel are formed, wherein the first channel penetrates the second channel at least in sections.

In particular, it is also conceivable that the channels in this pipe arrangement have a first orientation towards one another in a first section and a second orientation towards one another in a second section, wherein the first orientation is different from the second orientation. For this purpose, the first channel can be routed at least in sections within the second channel.

On the one hand, penetration makes it possible to save even more installation space and to be able to pass installation space sections with particularly small installation space. Furthermore, it is advantageous that the pipe arrangement is particularly compact and space-saving in the area in which a channel is routed within the second channel and has a robust outer surface. In addition, it is conceivable that the channels interact and are brought into thermal exchange, for example.

It is also conceivable that the first channel and the second channel cross each other at least in one section. Such crossing sections usually require a particularly large amount of installation space. Furthermore, the assembly effort is particularly high if the crossing section is formed from individual pipes. In the embodiment according to the disclosure, the section with the crossing channels is formed from the base body by a blow molding process. As a result, it is possible to manufacture the pipe arrangement in a particularly cost-effective manner and, moreover, it is possible to give the crossing section a space-saving geometry.

The first channel and the second channel may run at an angle to each other. In this embodiment, the pipe arrangement may form a crossing piece. For example, it is conceivable that the channels run at an angle of 90° to one another and intersect at a crossing point.

It is also conceivable that the first channel and the second channel run parallel in at least one section. In this area, the pipe arrangement has a particularly small installation space requirement.

At least one channel section of at least one channel may be formed as an insert. One or more inserts may be provided. Inserts are components which are designed separately from the base body. Inserts are placed in the blow mold prior to the blow molding process and are molded to the base body during the blow molding process. This makes it possible to implement crossing sections within the base body, while keeping the channels separate from each other so that there is no mixing of fluids.

In principle, it is conceivable that several channels are provided that cross one another. For example, two channels running parallel to each other may cross a third channel or two further channels running parallel to each other.

Preferably, the first channel and the second channel are routed in an arcuate way in the section. This avoids abrupt changes of direction, which reduces the flow resistance of the medium guided in the channels.

The first channel and the second channel may be routed in the section in the form of an S bend. This embodiment results in a particularly low flow resistance. The first channel and the second channel may have a cross-section in said section that is different from the other cross-sections of the pipe arrangement. For example, the cross-section of the channels in said section can be selected in such a way that a particularly space-saving geometry of the two channels results in this area. However, it is also conceivable that the design of the channels in said section is flow-optimized, so that the channels in this area have a particularly low flow resistance.

Preferably, the first channel and the second channel are flattened in said section. In this case, the first channel and the second channel may be flattened on two sides opposite each other. Alternatively, it is also conceivable that the two channels in said section are substantially rectangular when viewed in cross-section. This makes it possible for the pipe arrangement to be designed in a particularly space-saving way in said section as well and that overall a space-saving or even space-neutral pipe arrangement can be formed in which channels cross over each other. In addition to the round, flattened or rectangular design, oval shapes are also conceivable. Furthermore, it is conceivable that the channels are concave or convex in sections. In this regard, the first channel and the second channel may be formed congruently in the wall portions facing each other. To this end, for example, the first channel in the facing wall section may be concave in shape and the second channel in the corresponding wall section may be convex in shape. Similarly, it is conceivable that the first channel and the second channel each have cross-sections that differ from each other.

The first channel and the second channel may be connected with each other, at least in sections. The connection can be formed of a single material and in one piece and can be realized, for example, by a web formed onto the channels. The web can be continuous or in sections. Alternatively, the channels can also be in contact with each other in sections and be joined to each other in the contact sections by a material bond. In both embodiments, the pipe arrangement is particularly compact, and the channels are connected to each other in a manner that is secure against loss. According to a further embodiment, the first channel and the second channel may also be positively connected to each other. The positive connection may be implemented by means of positive locking elements formed from the channels or by means of a clip connection, wherein the clip connection may in particular be formed from a channel. It is also conceivable that the first channel and the second channel are connected to each other via a fastening device, wherein the fastening device simultaneously serves to fasten the pipe arrangement to a body or the like.

Openings may be formed in the channel section between the channels, with one or more channels passing through the openings. This makes the routing of the channels and the design of the crossing area particularly flexible, and it is particularly easy to implement changes in the orientation of the channels.

The first channel and the second channel may be connected to each other in a fluid-conducting manner. In this embodiment, medium can overflow from one channel into the other channel. In this context, it is particularly conceivable that a valve, in particular a switchable valve, is arranged in the connection between the first channel and the second channel. Furthermore, it is conceivable that a choke is arranged in the connection. The connection can be designed as a further channel. The further channel may be formed separately or may consist of a single material and manufactured in one piece with the first channel and/or the second channel.

At least one functional element may be arranged in the base body. The functional element is preferably assigned to at least one channel. In this way, the functional element is in direct contact with the temperature control medium and can either directly influence the volume flow of the temperature control medium or directly record status data of the temperature control medium, such as temperature, volume flow or pressure. The functional element can also be designed as a cooler, which is in contact with the temperature control medium and influences the temperature of the temperature control medium. Alternatively, the functional element can also be designed as a heating element.

The functional element may be formed from the base body. This is particularly conceivable if the functional element is a passive functional element and has no moving parts. For example, the functional element may form a throttle valve. A throttle valve, or expansion valve, reduces the pressure of the temperature control medium flowing through it by locally narrowing the flow cross-section, and at the same time causes the temperature control medium to expand. The throttle valve is designed as an unregulated throttle valve and forms a constriction of the channel. The fact that the throttle valve is formed directly from the base body makes the pipe arrangement particularly inexpensive and easy to manufacture. Furthermore, it is conceivable that the functional element forms a fastening device for fastening the pipe arrangement to a component. For this purpose, the functional element can be designed, for example, as an eyelet, clip, or the like.

The functional element can also be designed as a fluid distribution element. Furthermore, it is conceivable that the functional element is formed as a connecting element or connector. Thus, the pipe arrangement can be equipped to be connected to further components of a temperature control circuit. In this regard, the pipe arrangement may be integrated into a system having a plurality of pipes, with at least two of the pipes crossing each other. In this case, the fluid distribution element may form a junction or a Y-piece.

The pipe arrangement may form an internal heat exchanger, for example as part of an air conditioning unit. The internal heat exchange realized by the pipe arrangement is particularly compact and easy to integrate into the air conditioning circuit.

An internal heat exchanger integrated into the coolant circuit of an air conditioning system can increase the efficiency of an air conditioning system by transferring heat of the coolant from its high-pressure side to the low-pressure side. In this case, the coolant is liquid on the high-pressure side and gaseous on the low-pressure side, wherein the coolant on the high-pressure side is guided through the first flow channel and the coolant on the low-pressure side is guided through the second flow channel. An air conditioning circuit of a mobile air conditioning system, for example of a vehicle, comprises a closed circuit in which a coolant circulates. The coolant is compressed by a compressor and then enters a condenser where the coolant is liquefied. The liquefied coolant is fed to the internal heat exchanger, in which the coolant leaving the condenser transfers heat to the gaseous coolant leaving the evaporator. The liquid coolant then flows into the expansion valve, where the pressure of the coolant is reduced. In the evaporator, the coolant absorbs heat, wherein it evaporates and then becomes gaseous.

A vehicle according to the disclosure comprises a pipe arrangement according to the disclosure, according to one of the embodiments previously described. The pipe arrangement according to the disclosure is particularly compact and accordingly also particularly suitable for use in electric vehicles, which often have a particularly limited installation space.

BRIEF DESCRIPTION OF THE DRAWINGS

Some embodiments of the pipe arrangement according to the disclosure are explained in more detail below with reference to the figures. These show, in each case schematically.

DETAILED DESCRIPTION

Figure 1:
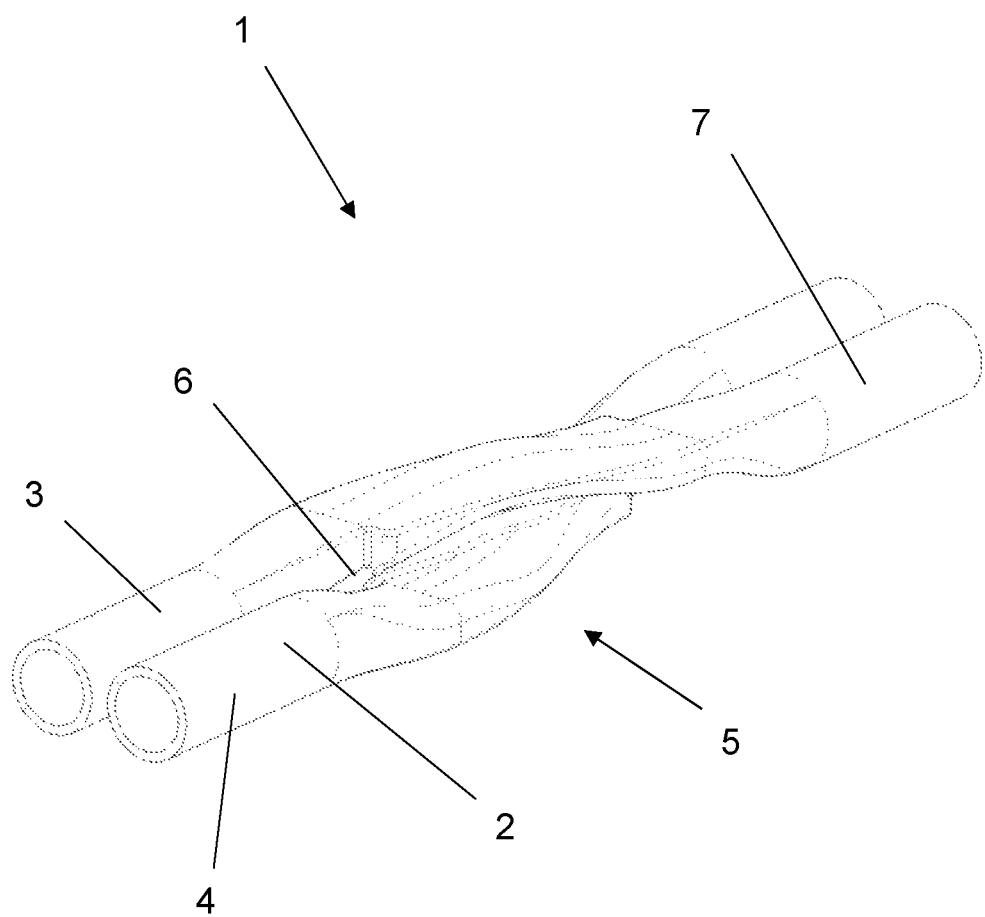
FIG. 1 a spatial representation of a pipe arrangement with crossed channels.

The figures show a pipe arrangement 1 for transporting temperature control medium. The pipe arrangement 1 is formed from a base body 2 of polymeric material produced by blow molding. A first channel 3 and a second channel 4 are formed from the base body 2, wherein the first channel 3 and the second channel 4 receive a temperature control medium. Depending on the embodiment, further channels 9 may also be provided. The pipe arrangement 1 often forms a manifold structure and is then also referred to as a manifold.

The base body 2 is made of a single material and in one piece as a blow-molded part and is made of a thermoplastic material, for example polypropylene or polyamide. In most cases, the channels 3, 4, 9 are connected to one another by a material bond, in that the boundary walls of the channels 3, 4, 9 are in contact with one another or in that a web is formed between the channels 3, 4, 9.

In the present case, the pipe arrangement 1 is part of a temperature control unit which is configured to control the temperature of the drive unit components of electric vehicles. In addition to the battery, this includes the power electronics and the electric motors. Furthermore, the temperature control unit is configured to cool the charging electronics and the associated plug connections and lines, which is particularly advantageous in connection with fast charging processes. Furthermore, the temperature control unit can be configured to temper, in particular to cool, components of the remaining vehicle electronics. Such components include sensors and computers for autonomous driving as well as on-board computers.

Alternatively, the pipe arrangement 1 may form part of an air conditioning circuit of an air conditioning system, wherein the air conditioning system is in the form of a mobile air conditioning system of a motor vehicle.

Figure 2:
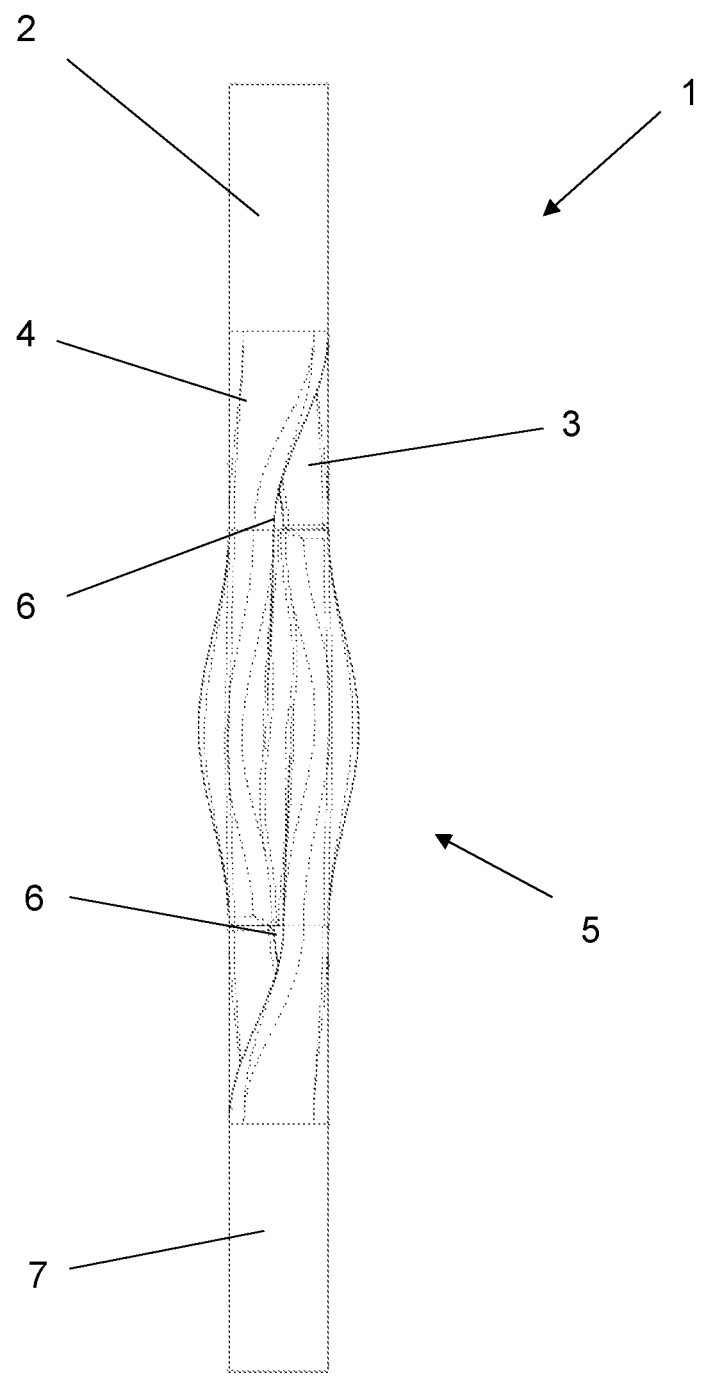
FIG. 2 a top view of the pipe arrangement according to FIG. 1.

In the embodiment according to FIG. 1 and FIG. 2, the first channel 3 and the second channel 4 are routed in the base body 2 in such a way that the first channel 3 and the second channel 4 cross in a crossing section 5. In the crossing section 5, the first channel 3 and the second channel 4 are routed in an arcuate manner in the form of an S bend.

In the crossing section 5, the first channel 3 and the second channel 4 have a cross-section that differs from the other cross-sections of the channels 3, 4 in the area of the pipe arrangement 1. In the crossing section 5, the first channel 3 and the second channel 4 are flattened. Viewed in cross-section, the first channel 3 and the second channel 4 in the crossing section 5 are thereby formed in a rectangular shape, wherein the corner regions of the rectangular channel cross-sections are rounded. The flattening of the first channel 3 and the second channel 4 is done in such a way that the height of the intersecting channels 3, 4 in the region of the crossing section 5 corresponds to the height of the channels 3, 4, when they are routed next to each other and have a round cross-section, in the regions outside the crossing section 5. As a result, the pipe arrangement 1 is largely neutral in terms of overall height as far as the installation space is concerned.

Outside the crossing section 5, the first channel 3 and the second channel 4 are materially-bonded to each other, wherein the channel walls of the channels 3, 4 abut and contact each other. Alternatively, the channels 3, 4 can also be connected to each other by means of fastening means in such a way that they cannot be lost, or they can be connected to each other by means of a web.

In the crossing section 5, openings 6 are formed between the channels 3, 4. Alternatively, a boundary wall can be arranged between the channels.

A functional element 7 is arranged in the base body 2. The functional element 7 is formed from the base body 2 of a single material and in one piece. In the present case, the functional element 7 forms a throttle.

Figure 3:
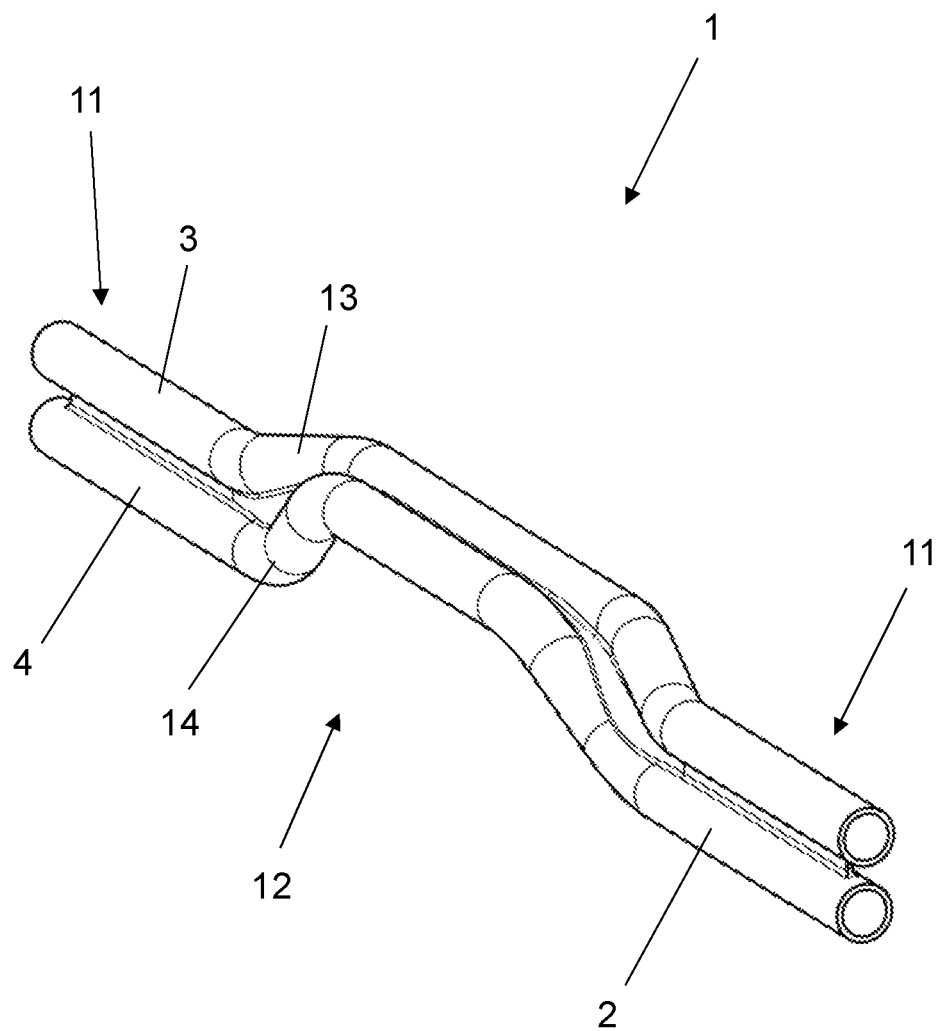
FIG. 3 a spatial representation of a pipe arrangement in which the channels change orientation.

In the embodiment shown in FIG. 3, the first channel 3 and the second channel 4 have a first orientation towards one another in a first section 11 and a second orientation towards one another in a second section 12, wherein the first orientation is different from the second orientation. Specifically, in this embodiment, the channels 3, 4 run parallel to each other in a first section 11 in a first plane and parallel to each other in a second section 12 in a second plane. In the first section 11, the channels 3, 4 run in a vertical plane and are arranged one above the other, and in the second section 12, the channels 3, 4 run in a horizontal plane and are arranged side by side. Accordingly, channels 3, 4 run parallel to each other in segments.

In the transitions between the first and second sections 11, 12, the channels are arcuate in a third section 13 and in a fourth section 14, wherein the orientation of the channels 3, 4 changes in the third section 13 and in the fourth section 14. The arcuate sections 13, 14 are formed such that the pipe arrangement 1 is U-shaped overall.

Figure 4:
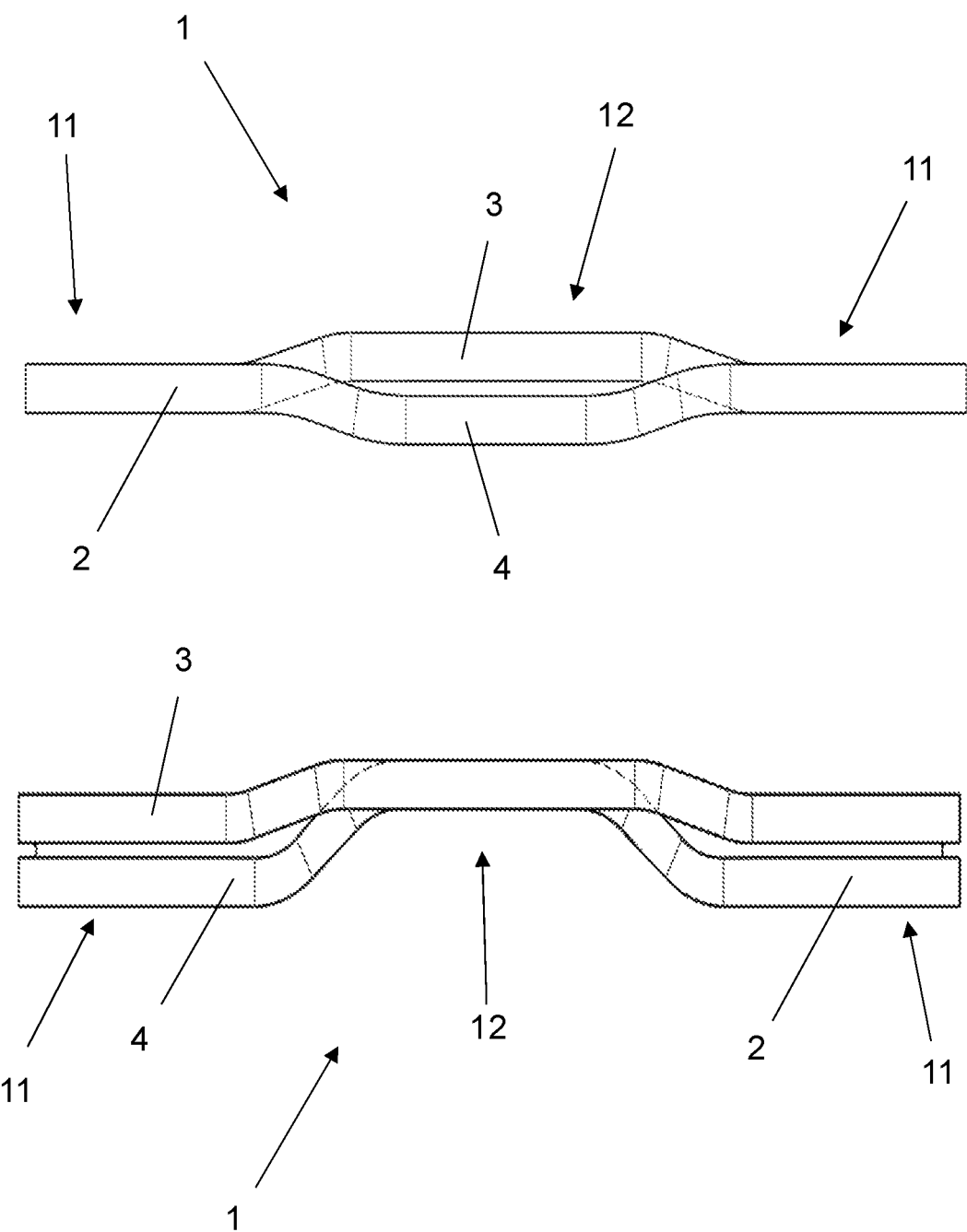
FIG. 4 a top and side view of the pipe arrangement according to FIG. 3.

FIG. 4 shows the pipe arrangement 1 shown in FIG. 3 in the upper area in top view and in the lower area in side view.

Figure 5:
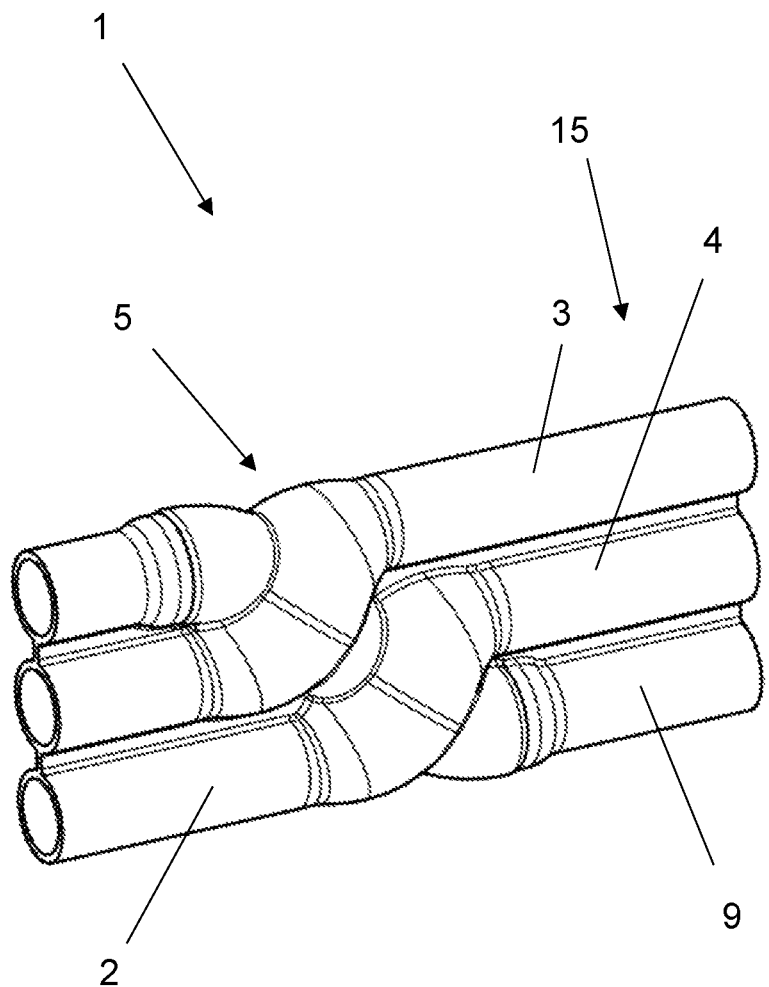
FIG. 5 a pipe arrangement with several crossed channels in spatial representation.
Figure 6:
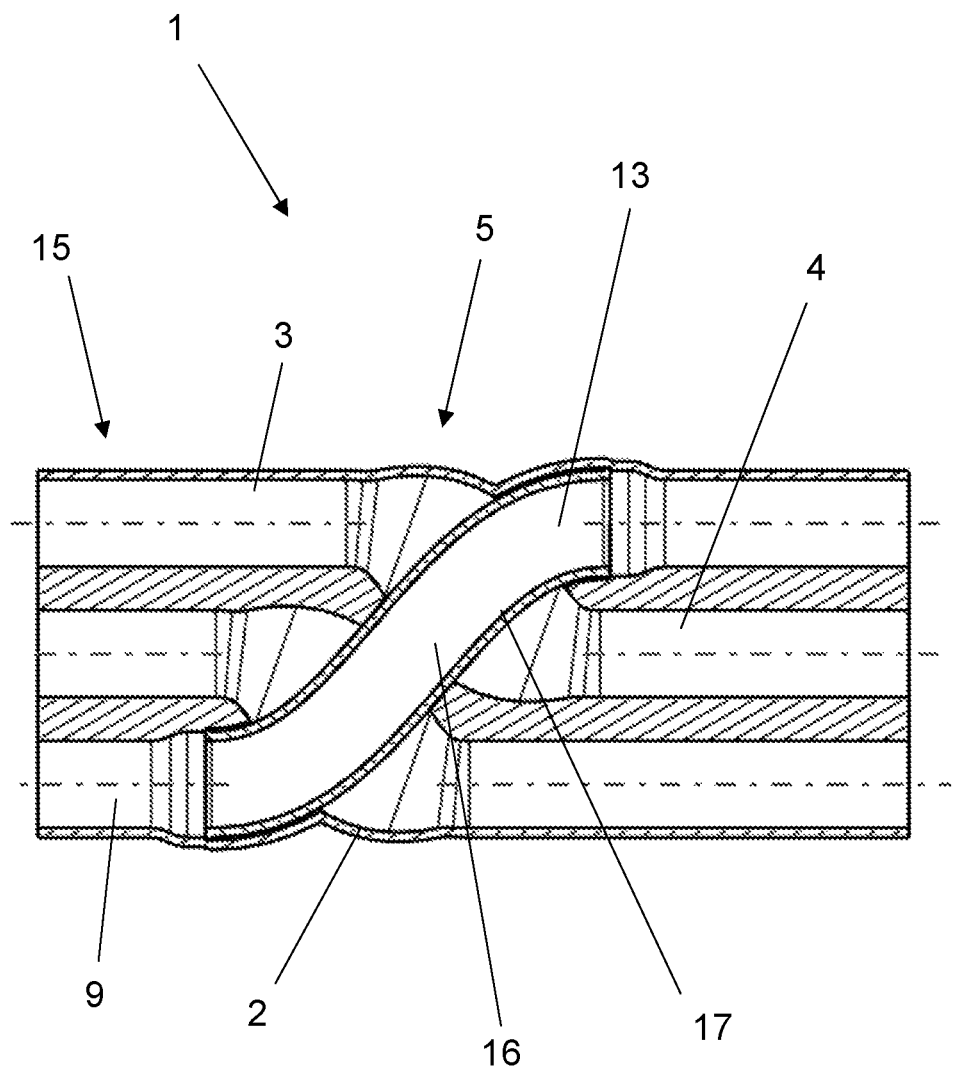
FIG. 6 a sectional top view of the pipe arrangement according to FIG. 5.

FIG. 5 shows a pipe arrangement 1 with three channels 3, 4, 9, wherein one channel 9 crosses the other two channels 3, 4 in a crossing section 5. For this purpose, channel 9 penetrates the other two channels 3, 4. In the crossing section 5, the channel 9 is routed within the other channels 3, 4. In order to keep the fluid flows within the channels 3, 4, 9 separated, a channel section 16 of the channel 9 is formed as an insert 17. The insert 17 is a tubular element through which the fluid flowing through the channel 9 is transported through the crossing section 5. The insert 17 can be seen in the sectional view in FIG. 6. Outside the crossing section 5, the channels 3, 4, 9 run parallel in segments 15. In all sections, the channels 3, 4, 9 run in one plane. The insert 17 is formed of polymeric material, but metallic materials such as aluminum may alternatively be considered.

Figure 7:
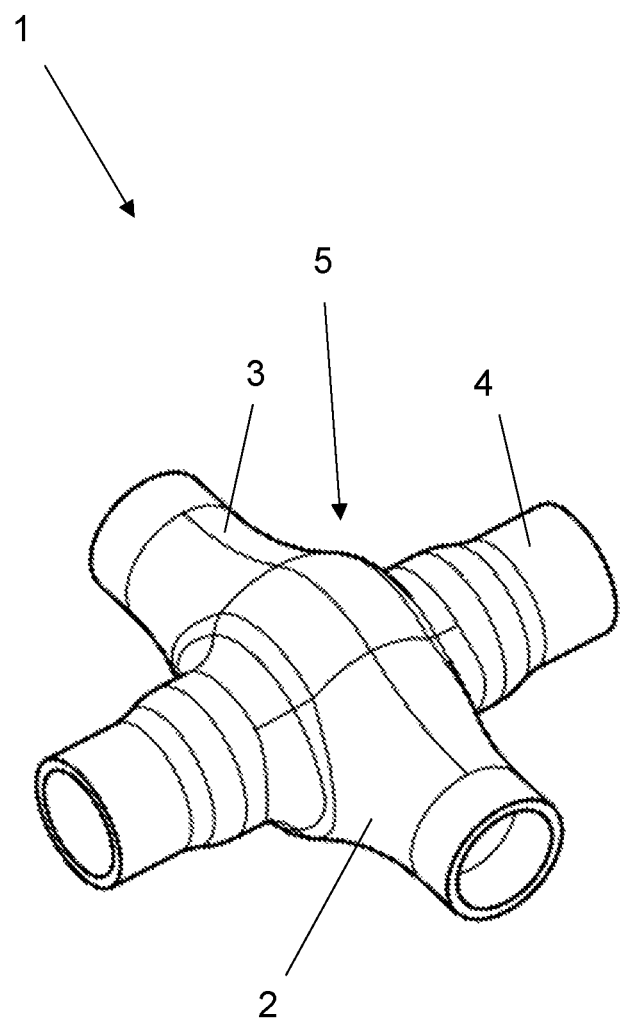
FIG. 7 a pipe arrangement in the form of a crossing in spatial representation.

FIG. 7 shows a pipe arrangement 1 with two channels 3, 4, wherein one channel 4 crosses the other channel 3 in a crossing section 5. The two channels 3, 4 run at an angle to each other, in this embodiment at right angles, so that the pipe arrangement 1 forms a crossing.

In the crossing section 5, the channel 4 penetrates the other channel 3, wherein the channel 4 is routed inside the other channel 3 in the crossing section 5. In order to keep the fluid flows within the channels 3, 4 separated, a channel section 16 of the channel 4 is formed as an insert 17. The insert 17 is a tubular element through which the fluid flowing through the channel 4 is transported through the crossing section 5. The insert 17 is inserted into the pipe arrangement 1 in a fluid-tight manner so that no overflow of medium can occur between the channels 3, 4. The insert 17 can be seen in sectional view in FIGS. 8 and 9.

Figure 8:
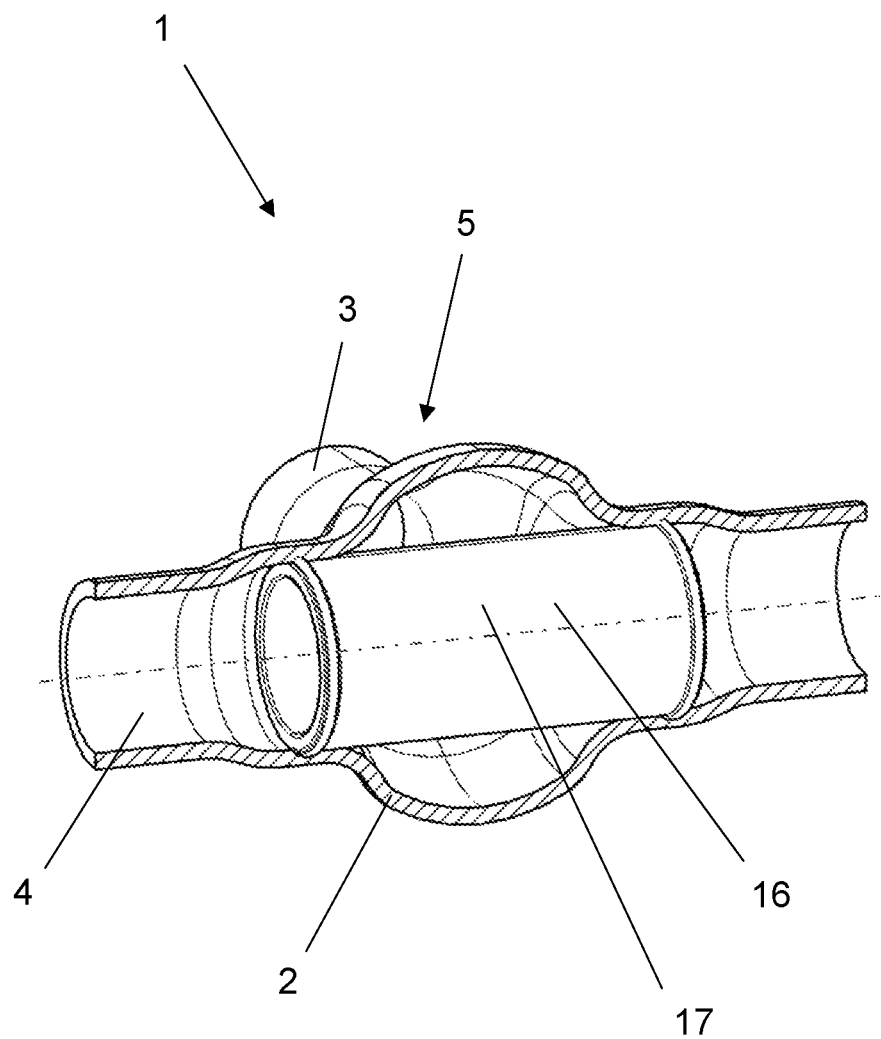
FIG. 8 a sectional spatial representation of the pipe arrangement according to FIG. 7.
Figure 9:
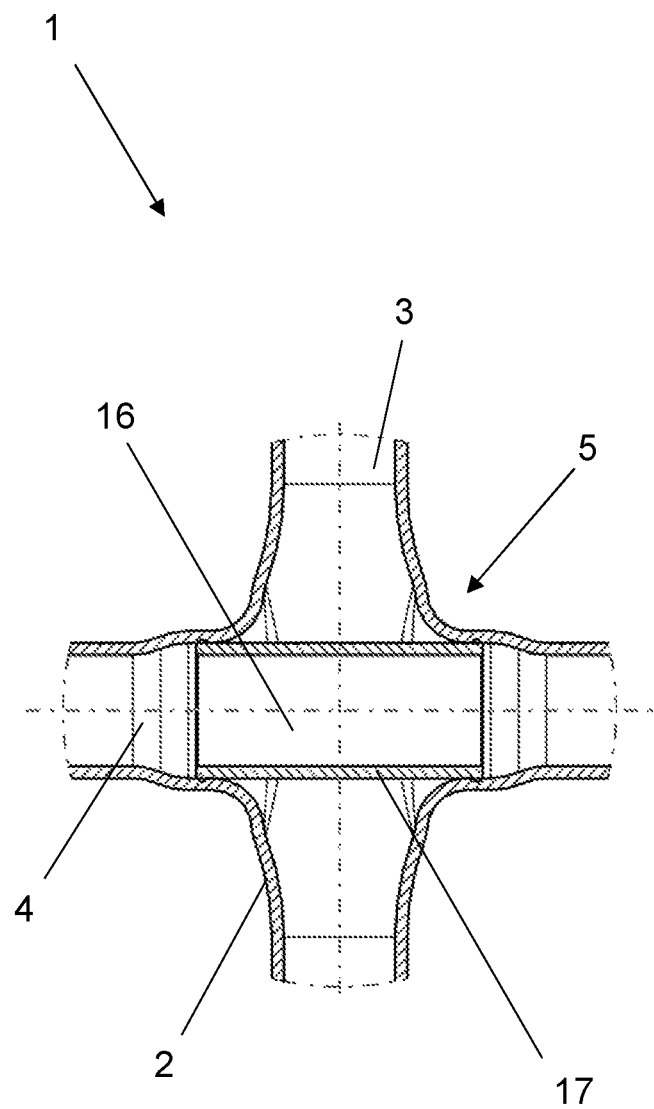
FIG. 9 a sectional top view of the pipe arrangement according to FIG. 7.
Figure 10:
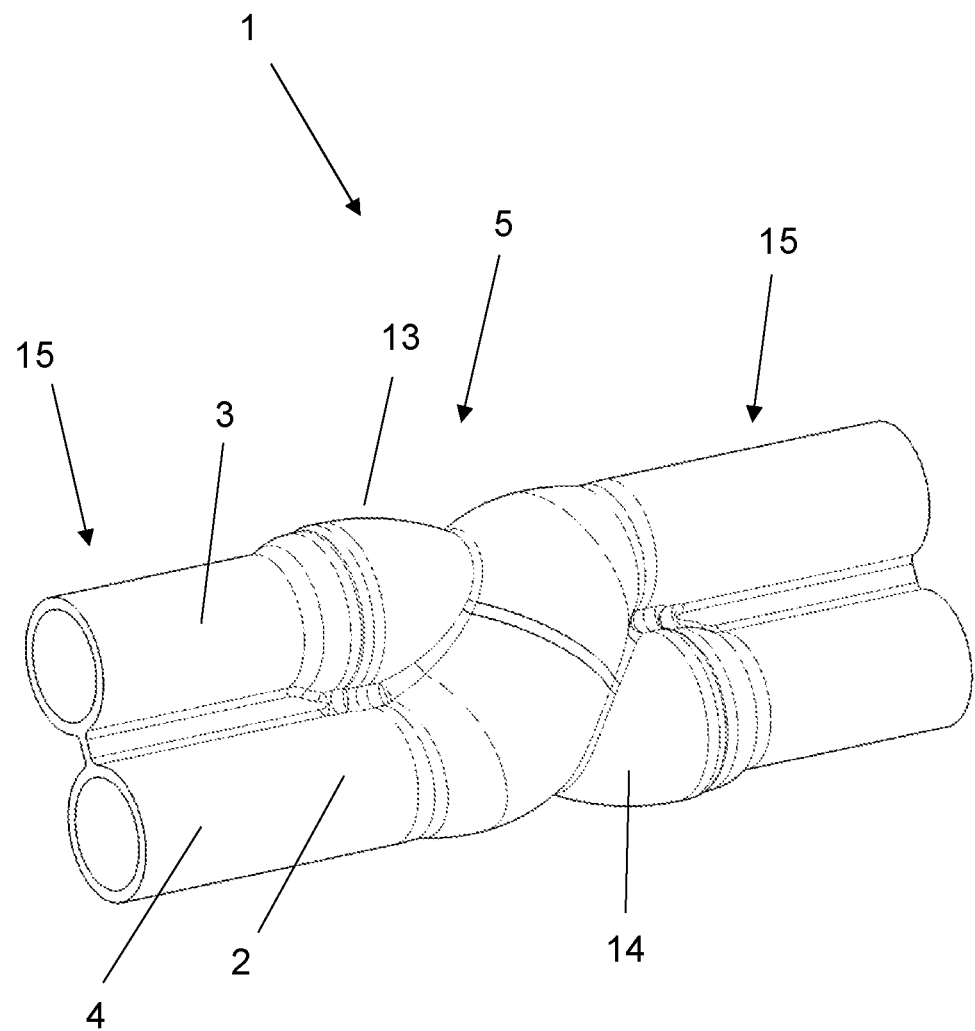
FIG. 10 a spatial representation of a pipe arrangement with crossed channels.
Figure 11:
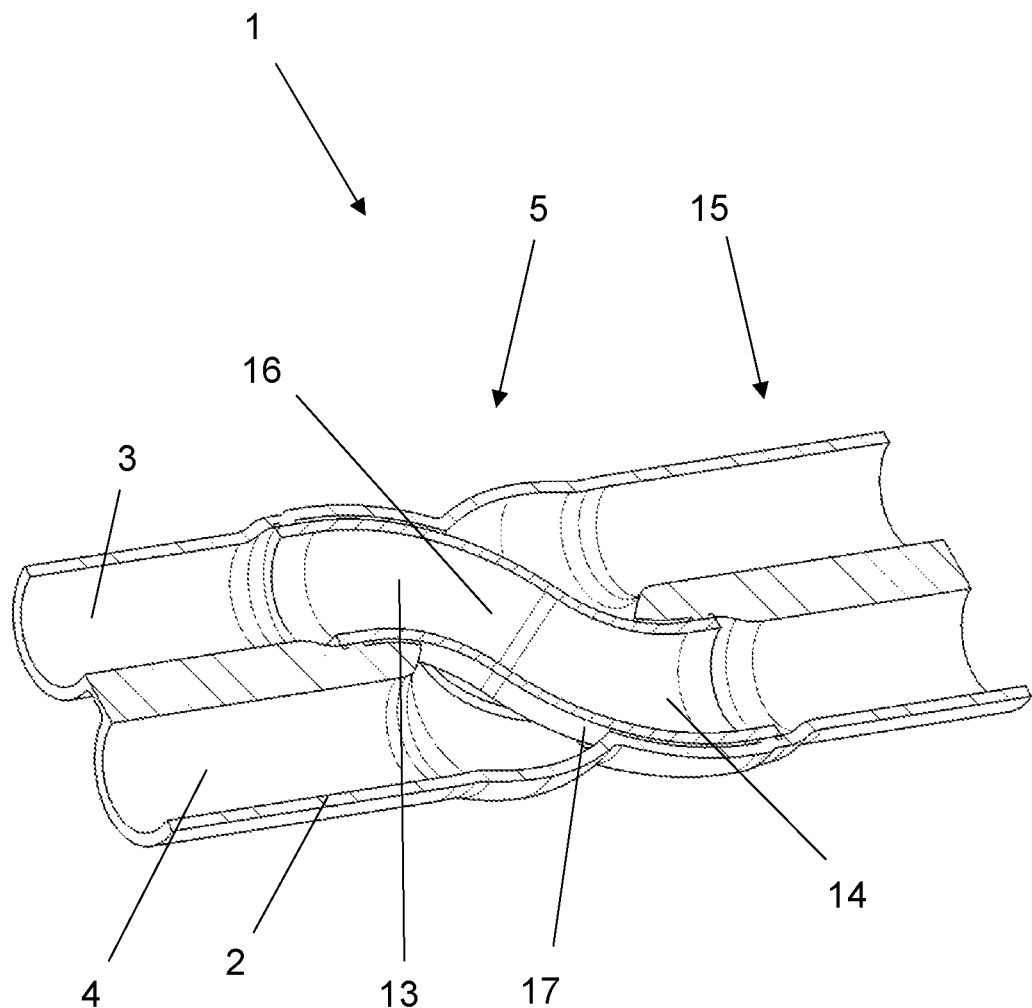
FIG. 11 the pipe arrangement according to FIG. 10 in spatial representation in section.

FIG. 10 shows a further development of the pipe arrangement 1 shown in FIGS. 7, 8 and 9. In the present embodiment, arcuate third and fourth sections 13, 14 adjoin the crossing section 5. The arcuate sections 13, 14 are formed in such a way that the channels 3, 4 run parallel to each other in segments 15. FIG. 11 shows a sectional view of the pipe arrangement 1 along with the insert 17 shown in FIG. 10.

Figure 12:
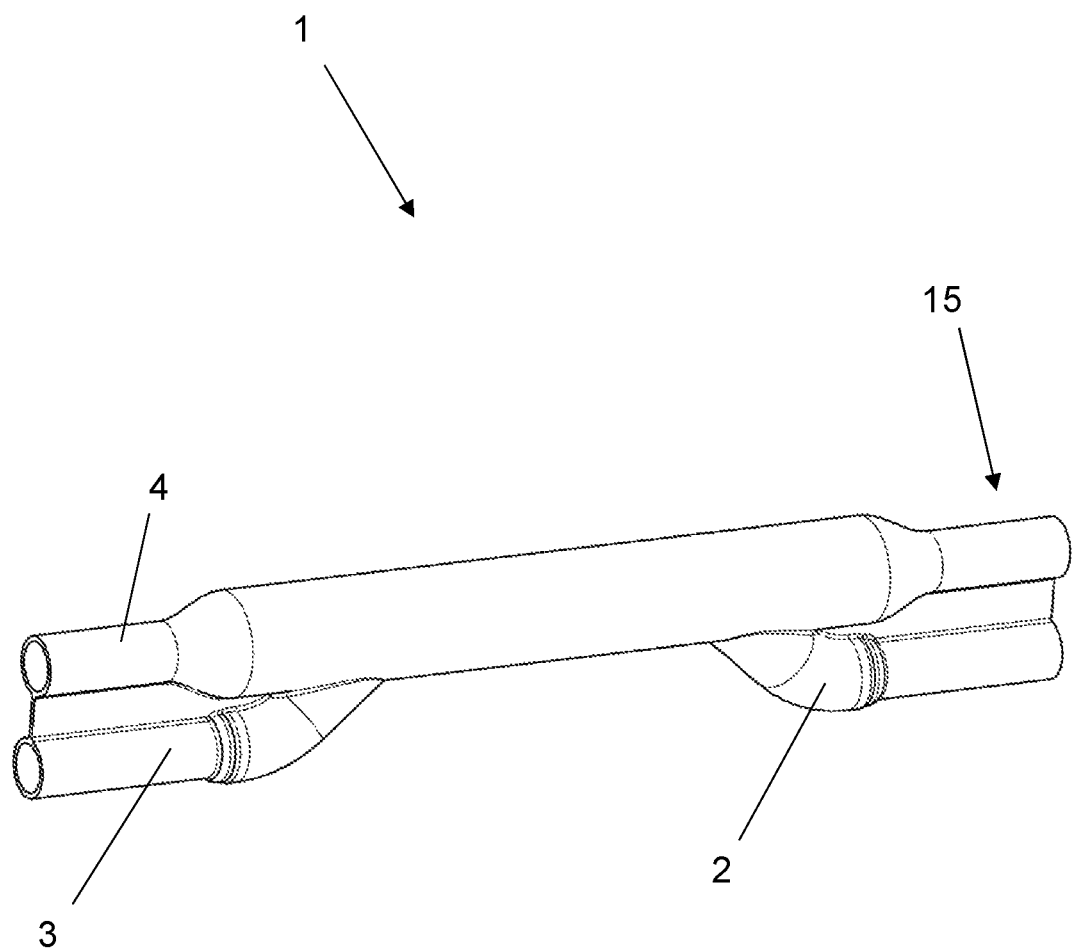
FIG. 12 a spatial representation of a pipe arrangement in which one channel runs in sections within another channel.
Figure 13:
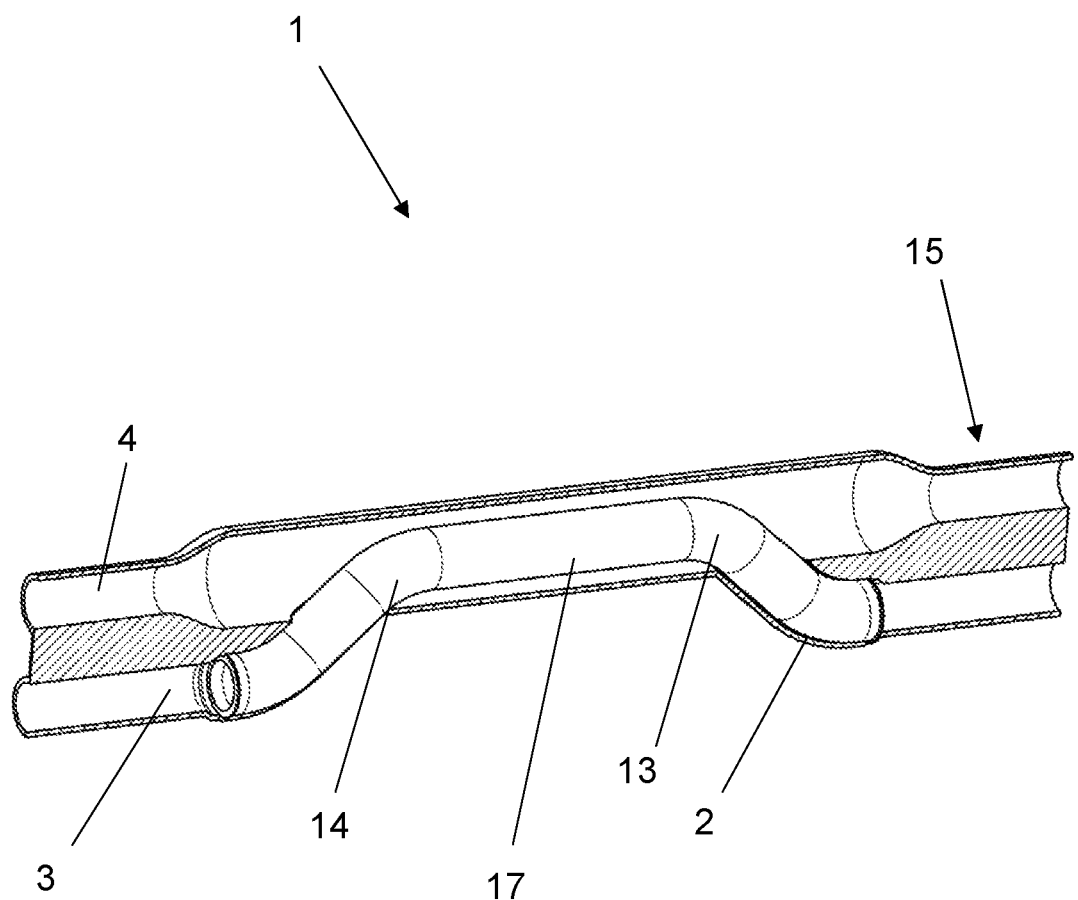
FIG. 13 the pipe arrangement according to FIG. 12 in spatial representation in section.

In the pipe arrangement 1 shown in FIG. 12, one channel 4 penetrates the other channel 3, so that one channel 4 is partially routed inside the other channel 3. In this case, the pipe arrangement 1 forms an internal heat exchanger of an air conditioning unit of a vehicle. In order to keep the fluid flows within the channels 3, 4 separated, a channel section of the channel 4 is formed as an insert 17. The insert 17 is a tubular element through which the fluid flowing through the channel 4 is transported through the area located inside the other channel 3. The insert 17 can be seen in the sectional view in FIG. 13.

The invention claimed is:

1. A pipe arrangement for transporting temperature control media, comprising a unitary base body which is produced by way of blow molding and from which at least a first channel and a second channel are formed, wherein the first channel and second channel are formed as enclosed tubular members defined by boundary walls, wherein the first channel and the second channel have a first orientation relative to one another in a first section and a second orientation relative to one another in a second section, wherein the first orientation is different from the second orientation, and wherein the first and second channels are formed in one piece and of a single material from the base body, wherein the first and second channels are connected along their length by a material bond formed by the boundary walls being in contact or a web formed between the first and second channels, the web extending along the length of the first and second channels.

2. The pipe arrangement according to claim 1, wherein the orientation of the channels changes in a third section located between the first and second sections.

3. The pipe arrangement according to claim 1, wherein the first channel penetrates the second channel at least in sections.

4. The pipe arrangement according to claim 1, wherein the first channel is routed at least in sections inside the second channel.

5. The pipe arrangement according to claim 1, wherein the first channel crosses through the enclosed tubular member of second channel.

6. The pipe arrangement according to claim 1, wherein a third channel is formed from the base body as an enclosed tubular member, and wherein the third channel crosses through the enclosed tubular members of the first channel and the second channel.

7. A pipe arrangement for transporting temperature control media, comprising a base body which is produced by way of blow molding and from which at least a first channel and a second channel are formed and defined by boundary walls, wherein the first channel and the second channel are routed in the base body in such a way that the first channel crosses through the second channel and its boundary wall in at least one section, and wherein the first and second channels are formed as enclosed tubular members in one piece and of a single material from the base body.

8. The pipe arrangement according to claim 7, wherein the first channel is routed in the at least one section in the form of an S bend, and wherein the second channel is routed in the at least one section in the form of an S bend.

9. The pipe arrangement according to claim 7, wherein the first channel and the second channel have, in the at least one section, a cross-section that is different from a cross-section of the first channel and second channel, respectively, in a second section that is spaced away from the at least one section.

10. The pipe arrangement according to claim 7, wherein the first channel and the second channel are flattened in the at least one section.

11. The pipe arrangement according to claim 7, wherein at least one functional element is arranged in the base body.

12. The pipe arrangement according to claim 7, wherein at least one functional element is formed from the base body.

13. The pipe arrangement according to claim 1, wherein the first channel and the second channel run at an angle to each other.

14. The pipe arrangement according to claim 1, wherein the first channel and the second channel run parallel in at least one segment.

15. The pipe arrangement according to claim 1, wherein at least one channel section of at least one channel is formed as an insert.

16. The pipe arrangement according to claim 1, wherein the first and second channels run parallel to each other in the first section in a first plane, and run parallel to each other in the second section in a second plane, wherein the second plane is non-parallel to the first plane.

17. The pipe arrangement according to claim 7, wherein the channels are connected to each other at least in sections.

18. The pipe arrangement according to claim 1, wherein the first channel and/or the second channel are formed in an arcuate manner in a third section and/or in a fourth section.

19. The pipe arrangement according to claim 1, wherein the pipe arrangement forms an internal heat exchanger for temperature control media.

20. A vehicle comprising the pipe arrangement according to claim 1.

21. The pipe arrangement according to claim 1, wherein the first channel defines a first flow path and the second channel defines a second flow path, and wherein the first and second flow paths are parallel to each other in the first and second sections, diverge and converge in a third section, wherein the third section is positioned between the first and second sections.

* * * * *